United States Patent [19]

Elliott et al.

[11] 3,881,799

[45] May 6, 1975

[54] RESILIENT MULTI-MICRO POINT METALLIC JUNCTION

[76] Inventors: George H. Elliott, 16501 Knollwood Dr., Granada Hills, Calif. 91344; Leonard F. Roman, 11018 Moorpark, North Hollywood, Calif.

[22] Filed: Sept. 11, 1972

[21] Appl. No.: 287,593

[52] U.S. Cl. ......... 339/252 R; 339/17 M; 174/68.5; 174/94 R

[51] Int. Cl. ........................ H01r 13/24; H01r 13/02

[58] Field of Search ....... 29/193.5, 625, 628, 630 R, 29/630 D, 630 G; 113/119; 151/3; 174/35 GS, 65 R, 94 R; 339/17 R, 17 M, 17 N, 18 R, 18 C, 19, 222, 252 R, 277, 278 R, 278 A, 278 M, 278 T

[56] References Cited

UNITED STATES PATENTS

| | | | |
|---|---|---|---|
| 662,003 | 11/1900 | Lamm | 339/277 R |
| 1,697,954 | 1/1929 | Gribbie | 339/277 R X |
| 2,317,813 | 4/1943 | Schoenborn | 174/35 GC |
| 3,275,736 | 9/1966 | Hotine et al. | 339/17 R X |
| 3,587,028 | 6/1971 | Uberbacher | 339/18 R X |
| 3,634,807 | 1/1972 | Grobe et al. | 339/17 LC |
| 3,670,409 | 6/1972 | Reimer | 29/625 |

*Primary Examiner*—Roy D. Frazier
*Assistant Examiner*—Lawrence J. Staab
*Attorney, Agent, or Firm*—Roger A. Marrs

[57] ABSTRACT

A dynamic interface contact device is disclosed herein having a sheet of electrically conductive material carrying a multiplicity of micro-contact junctions arranged in rows and columns projecting from opposite surfaces of the sheet. The sheet is formed with a predetermined pattern of slots disposed about each of the micro-contact junctions constituting a spring matrix permitting the micro-contact junctions to deflect under load to provide a multiple point contact between opposing substantially parallel surfaces of a pair of conductors.

10 Claims, 10 Drawing Figures

RESILIENT MULTI-MICRO POINT METALLIC JUNCTION

BACKGROUND OF THE INVENTION

1. Field of the Invention

This invention relates to contact junction or interface devices for connecting two electrical conductors together and, more particularly, to a novel contact element device having a multiplicity of micro-contact junctions resiliently carried on a sheet of electrically conductive material.

2. Description of the Prior Art

The purpose of a contact is to transfer electrical energy and thermal energy from one conductor to another conductor in the most efficient manner. The problems encountered in efficiently transferring this energy involve selecting the proper electrical contact material and surface geometry which takes into account major adverse forces such as heat, mechanical wear and environment. When operating above the arcing current of the contact material, heat and mechanical forces both interact to cause wear and erosion. Below the arcing current, the predominant factors are normally environmental and mechanical wear. At best, there exists no "ideal" contact material or configuration that will satisfy all contact applications.

It is the present practice to derive the selection of contact material and configuration geometry for a given application from a combination of scientific knowledge, empirical data and experience. Since it is not possible to fabricate two perfect parallel or flat surfaces, conventional electrical contacts cannot affect a full area closure between mated surfaces and must rely on contact between three points or areas at the interface of the mated surfaces. This problem has led to the design of contact points having special shapes such as dome or pointed shapes. However, these attempts only partially solve the problems of contact resistance, contact bounce and reliability. In critical situations, reliable transfer of current from one conductor to another is achieved by soldering or welding the conductors together. Even in this event, mechanical or material coefficient of thermal expansion must be compensated by employing a flexible member in the circuit package, in semi-conductor component assemblies for example, to overcome excessive stress and early failure.

Therefore, a long standing need has existed to provide a contact closure means for connecting two electrical conductors together with minimum contact resistance, maximum redundancy and reliability, and which possesses the ability to compensate for mechanical tolerances, misalignments, surface variations in flatness, parallelism and mismatch in material coefficient of thermal expansion.

SUMMARY OF THE INVENTION

Accordingly, the difficulties and problems encountered with conventional contact closures are obviated by the present invention which provides a contact closure means having a sheet of electrically conductive material formed with a slotted matrix for resiliently carrying a multiplicity of micro-point metallic junctions. In one form of the invention the sheet carries the multiplicity of micro metallic junctions arranged in rows and columns projecting from opposite side surfaces of the sheet. Each micro junction is carried on a movable portion of the sheet matrix so as to permit two dimensional deflection under loaded conditions. The movable portion is defined by a particular arrangement of closed end slots providing resiliency for the movable portion. The sheet material includes margins between adjacent ones of the movable portions of the matrix that provides support and relative stiffness for mounting the deflectable micro contact junctions.

Therefore, it is among the primary objects of the present invention to provide a novel contact closure device having controlled flexibility or deflection at the interface between two substantially parallel surfaces offering high reliability by providing a low current density per contact, minimum contact pressure and minimum coefficient of temperature mismatch.

Another object of the present invention is to provide a novel closure interface device having resilient multi-micro point metallic junctions that are self-adjusting to interconnect opposing wall surfaces of a pair of components.

Another object of the present invention is to provide a novel electrical and mechanical contact interface between opposing flat surfaces providing substantially more surface area contact between the surfaces than can be obtained by employing conventional gasket or contact devices.

Still another object of the present invention is to provide a novel interface contact device having resilient multi-micro point metallic junctions operable in a dynamic manner to provide self-alignment under load between opposing flat surfaces of components intended to be joined so as to attain greater surface area contact therebetween than can be ordinarily attained.

A further object of the present invention is to provide an interface contact devcie that is dynamic and self-adjusting to compensate for surface irregularities carried by opposite wall surfaces of components intended to be joined together whereby a multiplicity of contact areas are provided.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
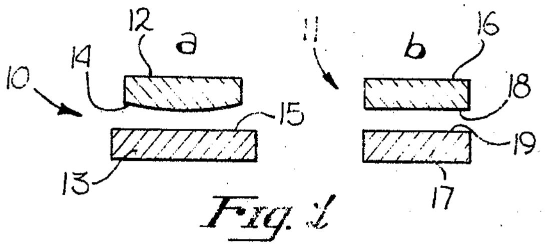
FIGS. 1*a* and 1*b* are cross-sectional views of typical conventional electrical contacts employed in the electrical and electronic industries for effecting contact closure between two electrical conductors.

Referring to FIGS. 1*a* and 1*b*, conventional contact closures are illustrated as indicated in the general direction of arrows 10 and 11. Contact closure 10 is of a typical dome configuration which includes one conductor 12 intended to be placed into contact with a second conductor 13. The opposing wall surface of conductor 12 is curvalinear as indicated by numeral 14 while the opposing wall surface of conductor 13 is flat as indicated by numeral 15. It is to be noted that although the curvalinear surface 14 includes a central portion which will immediately engage with surface 15 upon closure, the surface area is very small as compared to the overall diameter or surface area of the opposing wall surfaces and that the central portion will wear down due to pitting and corrosion.

Figure 2:
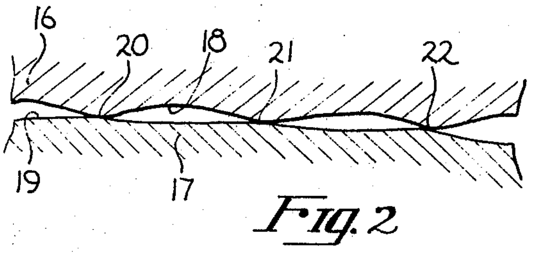
FIG. 2 is a greatly enlarged cross-sectional view of the usual connection interface between opposing flat surfaces of normal contact closures such as is shown in FIG. 1*b;*

With respect to the contact closures 11 shown in FIG. 1*b*, conductors 16 and 17 include opposing flat surfaces 18 and 19 intended to be placed in contact with each other upon closure of the conductors. However, minute surface irregularities always occur between parallel, flat surfaces so that contact is suubstantially made at three primary locatins. This fact is illustrated more clearly in FIG. 2, wherein the three points of contact are indicated by numerals 20, 21 and 22 respectively. It is to be understood that this same three-point contact relationship exists not only for parallel flat surfaces 18 and 19 but occurs with respect to surfaces 14 and 15 of the closure means 10. Even though surface 14 is curvilinear, the central portion will make initial contact with surface 15 and the three-point closure will occur. It is to be particularly noted that the illustrations are greatly enlarged and, with respect to FIG. 2, the three points illustrated by numerals 20, 21 and 22 are microscopic and that the surfaces are intended to be flat and parallel.

Figure 3:
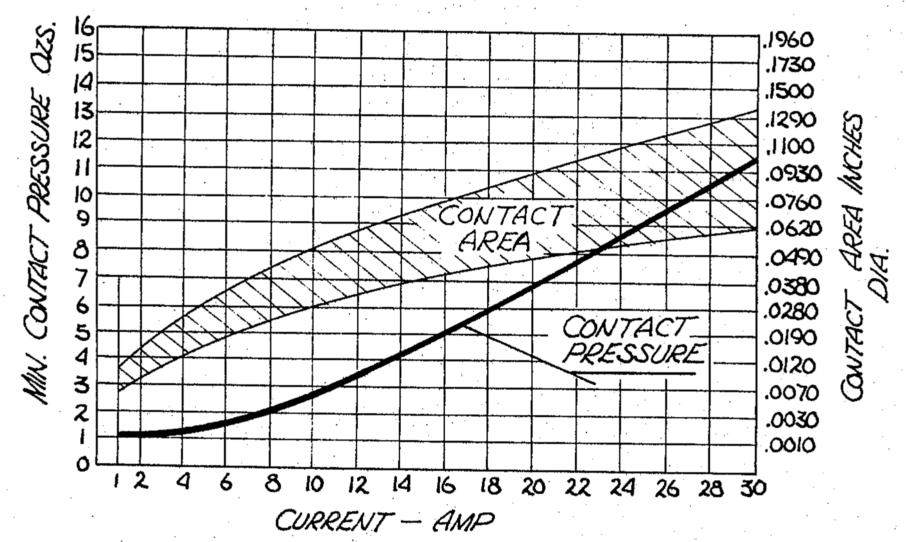
FIG. 3 is a graphic representation illustrating the contact area and minimum recommended contact pressure for medium and heavy duty conventional contact devices.

With reference to the graph shown in FIG. 3, the contact area in inches for conventional or prior contact closures is plotted with respect to current in amps and minimum contact pressure in ounces. The contact area expressed in inches of area diameter and contact pressure for minimum and heavy duty devices is based on using silver-cadmium-oxide alloys. The importance of the chart is to indicate that for conventional or prior contact closures, the contact area is extremely varied as indicated by the band of gray or shadowed area of the graph. The reason that the contact area cannot be made more definite is due to the adverse affects enumerated above. Because of the problems dealing with heat, mechanical wear and environment, no precise recommendation can be made concerning contact area for conventional closures so that only the area of the band within the limits of the outer edges thereof define approximate contact areas for current handling capabilities of the closures. Since parallel contact surfaces of conductors cannot be made absolutely flat, the three-point closure shown in FIG. 2 directly relates to the wide band of contact area shown in the graph. No single line curve can be plotted for contact area because of the surface irregularities in normally referred to parallel or flat surfaces.

Figure 4:
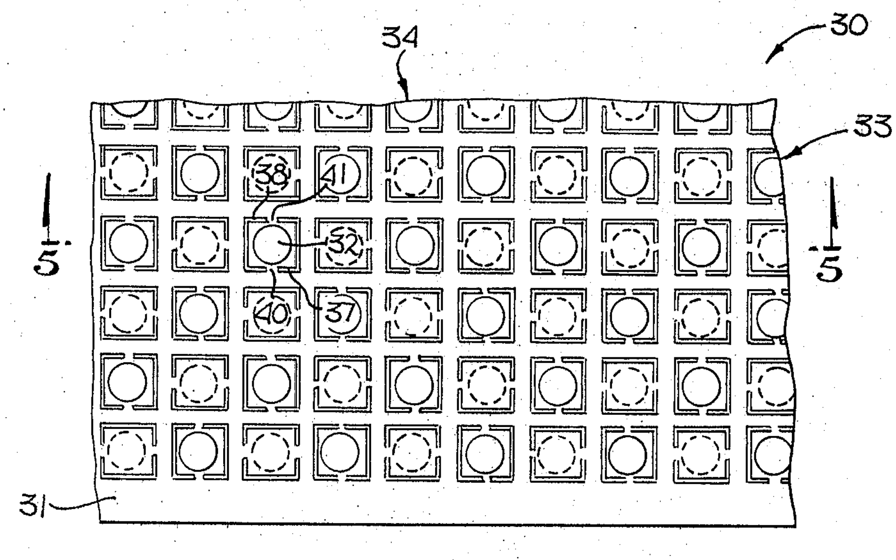
FIG. 4 is a top plan view of the resilient multi-micro point metallic junction device of the present invention.
Figure 5:
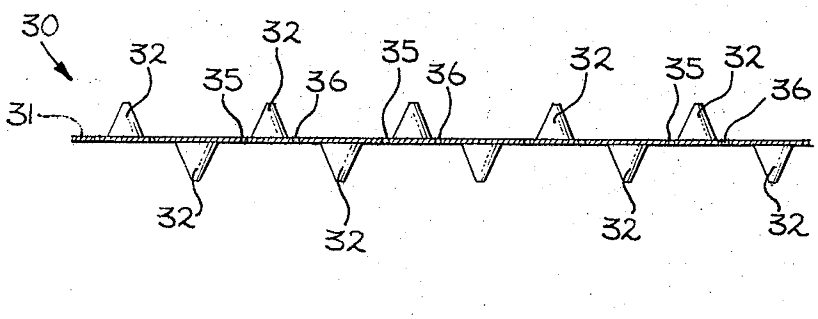
FIG. 5 is a transverse cross-sectional view of the interface contact or junction device shown in FIG. 4 and taken in the direction of arrows 5—5 thereof.

Referring now to FIGS. 4 and 5, the multi-micro point metallic junction of the present invention is illustrated in the general direction of arrow 30 which, in general, includes a sheet 31 formed with a plurality of contact junctions, such as indicated by numeral 32, that projects from opposite sides of the sheet surfaces. It is to be understood that for some applications, the contact junctions need only project from one surface of the sheet. The multiplicity of contact junctions are arranged in rows and columns such as is indicated by row 33 and column 34 and each of the contact junctions is movable with respect to the main body of sheet 31 by means of a spring matrix comprising slots disposed about each of the contact junctions. Margins of the sheet are disposed between adjacent slots of respective contact junction patterns. With respect to contact 32, parallel slots 35 and 36 are disposed on opposite sides of the contact junction while parallel slots 37 and 38 are disposed on the other sides of the contact junction and are disposed at right angles to the first mentioned parallel slots. Slots 37 and 38 are interrupted by means of bridges 40 and 41 that integrally connect the pad carrying the contact junction with the margin of the body of sheet 31. It is to be understood that other geometric configurations may be employed, such as spirals, concentric circles or the like.

The contact illustrated in FIGS. 4 and 5 are extremely exaggerated and enlarged from their actual size which is substantially microscopic in construction. The contact junction 30 is a precision contact which employs a multitude of individual small spring-loaded contact junctions 32 which will move only perpendicular to the plane of the sheet 31. One purpose of the device is to allow a high current to be transferred between opposing surfaces of a pair of conductors in a device or circuit uniformly over the whole area of the contacts so as to minimize local hot spots and excessive current density. Also, the spring action of the contact junctions will compensate for lack of exact parallelism and tolerances so that automatic compensation for thermal expansion and contraction of the total assembly is gained.

By way of example, typical dimensions included in the contact junction incorporate a diameter for each contact junction pattern of 0.008 inch from slot to slot and the slot width would have a dimension of 0.001 inch. It is to be noted that preferably, each contact junction is conical in shape having a flat top surface area within the range of 0.001 inch to 0.003 inch and a height of about 0.005 inch. However, it is to be understood that the geometry of the contact junction may be rounded or square. One such contact junction having a 0.100 inch square can typically handle 25 amps of current.

Figure 6:
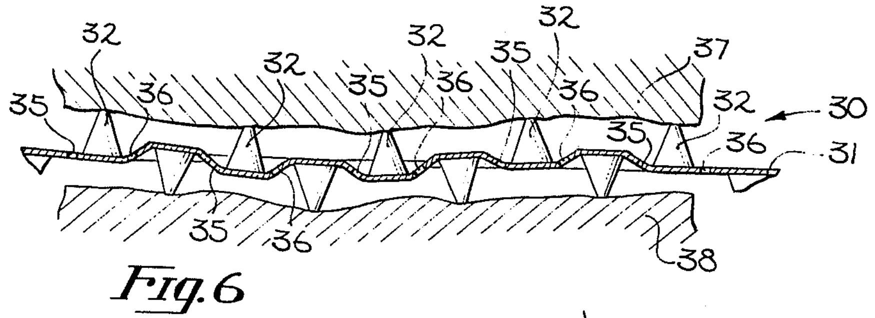
FIG. 6 is a view similar to the view shown in FIG. 5 illustrating the interface contact or junction device of the present invention under load and interconnecting the opposing irregular surfaces of a pair of conductors.

With respect to FIG. 6, the contact junction 30 is illustrated under compression between a pair of electrical conductors 37 and 38. The contact junction 30 is disposed between the opposing surfaces of the conductors and these opposing surfaces are initially fabricated as flat as possible. However, irregularities are shown which represent exaggerated deformities in the parallel flat opposing surfaces of the conductors. Again, it is to be understood that the drawing is greatly enlarged and that the showing in actual practice is microscopic in dimension. It can be seen that, under load, the multimicro contact junction 30 deformes or deflects to compensate for surface irregularities under the spring bias created by the slots surrounding each of the contact point junction patterns.

The multi-contact point junction of the present invention will uniformly contact the opposing conductor surfaces and can be metallurgically bonded to either or both surfaces, if desired. However, the contact junction has the desirable feature of allowing the surfaces to move vertically relative to each other without breaking the bond or the physical contacts or scrubbbing off the precious metal plating normally used for minimum contact resistance. The contact junction may be fabricated by a combination of chemical milling and plating, or laminate and etching techniques. The material or materials can be selected to meet any physical requirements that a specific application demands. The component is a monolithic structure which, in itself, functions as a dynamic machine in that each of the multi-micro contact point junctions deflects in accordance with the load applied by the opposing surfaces of the conductors. The inventive contact junction will not scratch or scrub the surfaces being contacted during temperature cycling and nominal use. Mechanical tolerances are compensated for and the contact junction will follow non-flat or non-parallel surfaces which are to be contacted.

In general, the multi-micro contact metallic junction employs a sheet material such as steel, Kovar or nickel which is etched to provide the slots. Etching the slots may be achieved by chemical milling techniques or the like. Initially, copper may be plated over both sides of the sheet thickness determined by the total motion or deflection desired. Next, the copper is etched to provide the slotted pattern through the thickness of the material so that a plurality of floating sections or portions of the sheet are provided. These flexible portions or patterns are then plated with a desired contact material to the height required. In one form, the plated height (thickness) occurs in an alternate manner between the opposite surfaces of the sheet so that the contact junction which results projects outwardly from both sides of the sheet.

One form of the contact component 30 can be produced with slots by chemical milling and chemical fabrication techniques which include plating and photolithographic steps to produce the part in three dimensions. After fabrication of the sheet 31, a multi-micro junction contact is produced on each slotted pattern which can make a multitude of independently held contacts, each independently spring loaded in two directions providing more than fifty contacts on each side of a 0.100 inch × 0.100 inch square component sheet. This monolithic structure provides efficient assembly and fabrication of numerous electronic packages where previously only some form of soldered contact could be used. Also, the monolithic structure allows minimum size and maximum efficiency not only in the electrical performance of the end product but in assembly techniques, especially where expensive soldering and bonding operations were previously required.

As an example of one configuration of the multimicro contact junction, a rectifier junction contact may be constructed by etching 0.001 to 0.002 inch slots according to the pattern illustrated on the sheet 31 of 0.0005 to 0.001 inch thick metal, such as Kovar, Rodar, Molly or the like. The etched or slotted sheet serves as the matrix spring which provides a lateral thermal coefficient close to that of the silicon rectifier junction. Next, a series of silver, copper, etc., conical contact junctions are placed in the area between slots within the patterns by either plating up through a photoresist or etching back a plated structure which was previously plated after the slots were etched on the sheet. Fifty contact junctions are placed in rows and columns on the resilient matrix. If desired, the entire matrix can be plated to establish a desired spring force, electrical conductivity, and thermal conductivity of the working component. The slots provide a desired flexibility for the matrix and each of the raised contact junctions may have a thickness or height of 0.002 to 0.005 inches. Each of the raised contact junctions can be independently deflected via the support matrix providing the intimate contact and required pressure at each of the more than fifty locations provided by the rows and columns of raised contact junctions. The fifty contact junctions may be located on a contact sheet no larger than 1/10 inch square.

This results in an area contact which will have less than 1/50th the contact resistance of a single element contact. Each individual raised contact junction may be capable of carrying up to 1 amp of current and in less than 1/10th square inch. The inventive contact is capable of handling current up to 50 amps for the dimensions specified.

As a contact means for a typical 10 amp rectifier junction, the inventive multi-micro contact junction will carry less than 0.2 amps per raised contact junction distributed uniformly over the entire contact matrix thereby minimizing hotspots and improving electrical characteristics. The normal solder assembly technique will stress the semiconductor junction at elevated temperatures because solders do not expand at the same rate as the silicon but as much as 400 percent faster. The contact junction element constructed according to the above dimensions and materials will match the silicon with less than 25 percent thermal coefficient mismatch.

Aside from usage of the inventive contact of the present invention as a rectifier junction contact, the applications for the inventive contact extend throughout the electrical-electronics industry. Some examples include component assemblies such as hybrid circuit packaging, semiconductor contacts, resistors, relays, switches, keyboards, connectors, etc. If fabricated from plastic or metal and plastic combinations, a whole new group of applications becomes apparent such as, for gaskets and washers disposed between dissimilar metals such as in the microwave field and the heavy electrical conductor field.

Figure 7:
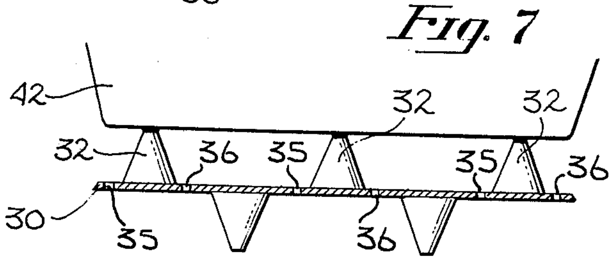
FIG. 7 is a side elevational view of the novel interface contact or junction device of the present invention illustrated as being secured to the surface of a single conductor.

FIG. 7 illustrates a single conductor 42 having the multiple micro-point metallic contact junction of the present invention bonded thereto. The contact junction is indicated by numeral 30 and is identical to the form and configuration shown in FIG. 3. However, the terminating points of each of the raised contact junctions 32 are bonded to the conductor 42 such as may be achieved through a copper-silver plating with a flash of tin. In this connection, the contact junction will follow the movement of the conductor 42 and the raised contact junctions on the opposite side of sheet 31 will form a make-and-break contact with another conductor such as a terminal or pad on a circuit board.

Figure 8:
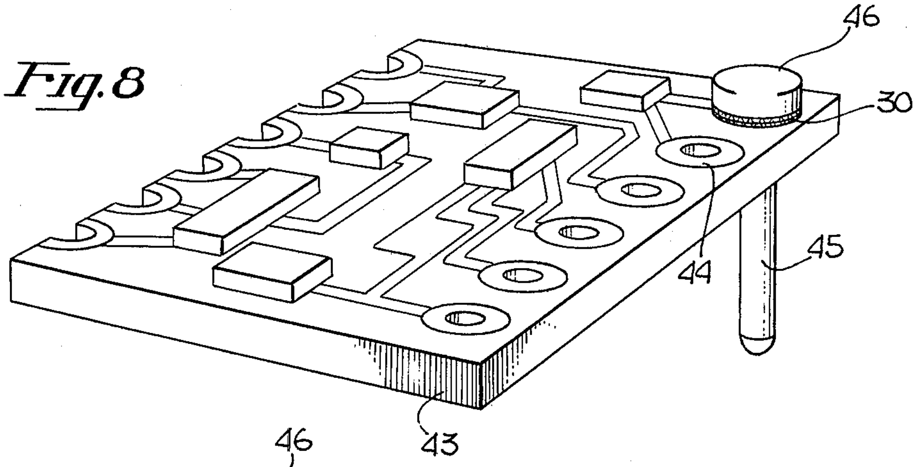
FIG. 8 is a perspective view of a typical semiconductor component package or assembly having multiple terminals carried on a substrate or circuit board and illustrating the interface contact or junction device of the present invention in an application for interconnecting a terminal to a connector pin.

Still another application of the present invention resides in a hybrid, micro-electric circuit package shown in FIG. 8 which assembly is indicated by the numeral 43. The assembly includes a substrate for carrying a plurality of electrical components such as resistors, capacitors, diodes and the like which are interconnected by a circuit network composed of copper conductors plated or etched on the substrate. As is the usual practice, these conductors terminate along the edge marginal region of the substrate or circuit board in a plurality of land terminals such as is indicated by numeral 44.

Figures 9, 10:
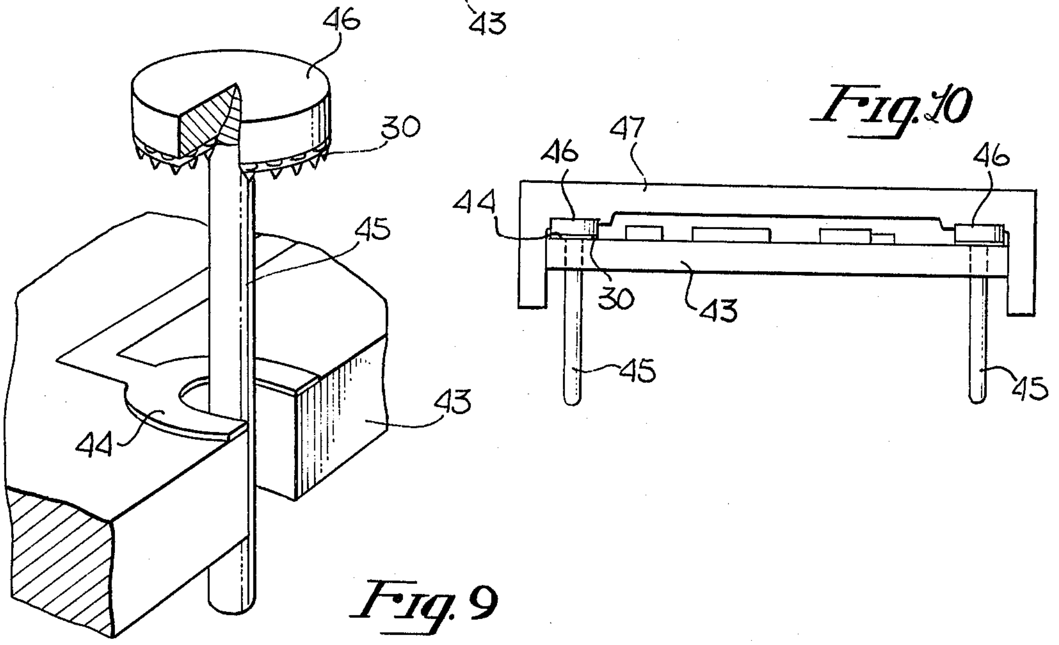
FIG. 9 is an enlarged perspective view of the terminal conductor pin shown in FIG. 8 employing the novel contact junction device preparatory to installation with the terminal of the circuit board.
FIG. 10 is a transverse cross-sectional view of the semi-conductor package shown in FIG. 8 fully assembled, including a cap or cover mounted over the components carried on the circuit board or substrate.

The conductor terminals 44 on the circuit package substrate are connected to other circuits in the system by means of terminal pins such as pin 45. The pin normally includes a shank and a head portion that is indicated by numeral 46. The inventive contact junction may be disposed between the conductor terminal land 44 and the underside of the terminal pin head 46. An enlarged view is shown in FIG. 9 wherein the inventive contact 30 is greatly exaggerated in size so as to clearly illustrate the connection of the tops of the raised contact junction associated with sheet 31 with the underside of head 46 and that the raised contact junctions on the opposite side of sheet 31 will readily connect with the land terminal 44 on the substrate. To complete the assembly as shown in FIG. 5, a cap or cover 47 snap locks or fits over the component side of the substrate. The shanks of terminal pin 45 extend outwardly and are exposed for interconnection into plugs or other electrical components to complete the circuit system.

Therefore it can be seen from the foregoing that the multi-micro point contact junction of the present invention offers high reliability by providing a low current density for a contact element, minimum temperature coefficient mismatch, minimum contact pressure by spreading of total force, minimum series ohmic resistance in the component assembly by maximum redundancy of parallel connections, minimum extraneous inductance which all combine to provide an overall increase in component performance and reliability and a reduction in physical size and cost. Additionally, the inventive contact lends itself to laminate applications where controlled flexibility is required between two parallel surfaces and it can act as a dynamic washer, valve seat, shock absorber, machine or motor mount etc. in applications where materials like rubber, cork or the like are undesirable.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An electrical contact disposed between opposing irregular surfaces for making electrical connection therebetween, the combination comprising:

a pliable sheet of electrically conductive metallic material;

a plurality of raised contact means outwardly projecting from opposite sides of said pliable sheet;

means formed in said pliable sheet associated with each of said raised contact means to permit separate and individual deflection of said raised contact means in response to engagement with the opposing irregular surfaces;

said last mentioned deflection means constructed to permit outward movement of said contact means substantially normal to said sheet and in parallel direction with respect to each other; and said deflection means comprise a pair of U-shaped slots formed about each of said contact means so as to define a bridge on opposite sides of each contact means solely and flexibly interconnecting said contact means with said pliable sheet.

2. The invention as defined in claim 1 wherein said plurality of contact means are arranged in parallel rows and columns on said sheet.

3. The invention as defined in claim 2 wherein said contact means are carried on both sides of said sheet and project outwardly from the opposite sides of said sheet.

4. The invention as defined in claim 3 wherein said contact means are alternately carried on opposite sides of said sheet.

5. The invention as defined in claim 4 wherein said contact means are micro-metallic contact junctions substantially conical in cross-section and terminating in a flat surface.

6. The invention as defined in claim 5 wherein each of said micro-metallic contact means are raised from said sheet to a height within the range of 0.003 to 0.005 inches and said terminating flat surface is approximately 0.002 inches across.

7. The invention as defined in claim 6 wherein said slots are approximately 0.0005 to 0.001 inches in width and said sheet is approximately 0.0005 to 0.005 inches in thickness.

8. The invention as defined in claim 1 wherein said raised contact means comprise micro-metallic contact junctions arranged in alternate outwardly projecting relationship with respect to the opposite sides of said pliable sheet and wherein said contact junctions are arranged in an orderly and predetermined pattern on opposite sides of said pliable sheet in spaced-apart relationship with respect to said contact junctions on the same side of said pliable sheet.

9. The invention as defined in claim 1 wherein said contact means are arranged in rows and columns on opposite sides of said pliable sheet and wherein said contact means carried on a first side of said pliable sheet are offset and out of alignment with said contact means carried on a second side of said pliable sheet and wherein said deflection means comprises a slotted arrangement formed in said pliable sheet substantially surrounding each of said contact means whereby the electrical contact substantially conforms to the opposing irregular surfaces in response to engagement of said contact means with the opposing irregular surfaces.

10. The invention as defined in claim 1 wherein said contact means are carried on opposite sides of said pliable sheet in an offset arrangement.

* * * * *